(12) United States Patent
Paasch et al.

(10) Patent No.: US 8,056,764 B2
(45) Date of Patent: Nov. 15, 2011

(54) METERED VOLUME LIQUID DISPENSING DEVICE

(75) Inventors: Ronald Paasch, Northampton, MA (US); John Walsh, Norfolk, MA (US); Steven Ettelson, Hollis, NH (US); Jo Ann M. Jorge, Ashland, MA (US)

(73) Assignee: Select-Measure Consumption, L.L.C.

( * ) Notice: Subject to any disclaimer, the term of this patent is extended or adjusted under 35 U.S.C. 154(b) by 1013 days.

(21) Appl. No.: 11/166,554

(22) Filed: Jun. 24, 2005

(65) Prior Publication Data

US 2006/0021511 A1 Feb. 2, 2006

Related U.S. Application Data

(60) Provisional application No. 60/583,224, filed on Jun. 24, 2004.

(51) Int. Cl.
*B67D 7/80* (2010.01)
(52) U.S. Cl. .................. 222/146.5; 222/179.5; 222/309; 219/433
(58) Field of Classification Search ............... 222/146.5, 222/402.15, 402.13, 307, 146.2, 146.1, 309, 222/325, 324, 153.13, 148, 151, 149, 146.3, 222/179.5; 219/433, 386, 432, 442, 43
See application file for complete search history.

(56) References Cited

U.S. PATENT DOCUMENTS

| | | | | |
|---|---|---|---|---|
| 2,756,905 A | * | 7/1956 | Wickesberg | 222/146.5 |
| 3,432,641 A | * | 3/1969 | Welke | 219/433 |
| 3,511,416 A | * | 5/1970 | Michie | 222/305 |
| 3,701,478 A | * | 10/1972 | Tada et al. | 239/333 |
| 3,756,460 A | | 9/1973 | Hill | |
| 3,758,005 A | * | 9/1973 | Christine et al. | 222/309 |
| 3,840,157 A | * | 10/1974 | Hellenkamp | 222/309 |
| 3,846,614 A | * | 11/1974 | Doyle et al. | 392/474 |
| 3,904,086 A | * | 9/1975 | Losenno | 222/146.5 |
| 4,011,992 A | * | 3/1977 | Olsen | 239/135 |
| 4,033,484 A | | 7/1977 | Ornsteen | |
| 4,094,446 A | * | 6/1978 | Brutsman | 222/146.5 |
| 4,102,323 A | | 7/1978 | Pritz | |
| 4,144,032 A | | 3/1979 | Davis, Jr. | |

(Continued)

FOREIGN PATENT DOCUMENTS

GB 2187660 A 9/1987

OTHER PUBLICATIONS

International Search Report PCT/US2005/022525 dated Dec. 2, 2005.

*Primary Examiner* — Kevin P Shaver
*Assistant Examiner* — Daniel R Shearer
(74) *Attorney, Agent, or Firm* — Wolf, Greenfield & Sacks, P.C.

(57) ABSTRACT

A hand-operated device that can be actuated to dispense a predetermined volume of liquid food product (LFP) for use in food preparation and food consumption is provided. The device includes an actuator, an opening, a reservoir for storing the food product, and a liquid metering device for controlling a volume of LFP dispensed at the opening. The device may include a heater that functions to heat and/or liquefy the food product. The device may also include a volume adjuster that allows a user to vary the predetermined volume of LFP dispensed with each actuation of the device.

11 Claims, 5 Drawing Sheets

U.S. PATENT DOCUMENTS

| | | |
|---|---|---|
| D253,451 S | 11/1979 | Ng |
| 4,177,293 A | 12/1979 | Forman et al. |
| 4,276,821 A | 7/1981 | Brown |
| 4,310,316 A | 1/1982 | Thomann |
| 4,349,129 A | 9/1982 | Amneus |
| 4,408,919 A | 10/1983 | Wolff et al. |
| 4,464,983 A | 8/1984 | Chappell et al. |
| 4,477,023 A * | 10/1984 | Gates ............................ 239/340 |
| 4,544,085 A * | 10/1985 | Frazer ........................ 222/146.4 |
| 4,627,414 A * | 12/1986 | Chazin ........................... 126/215 |
| 4,676,186 A | 6/1987 | Drainas |
| 4,678,122 A | 7/1987 | Riglietti |
| 4,684,045 A | 8/1987 | Su |
| 4,720,290 A | 1/1988 | McCoy |
| 4,753,390 A | 6/1988 | Henderson |
| 4,798,332 A | 1/1989 | Lierke et al. |
| 4,830,068 A | 5/1989 | Langenhahan et al. |
| 4,865,006 A | 9/1989 | Nogi et al. |
| 4,892,225 A | 1/1990 | von Zelewski et al. |
| 4,893,732 A | 1/1990 | Jennings |
| 4,938,392 A | 7/1990 | Su |
| 4,941,597 A * | 7/1990 | Lopez et al. ................ 222/146.5 |
| 4,964,745 A | 10/1990 | Deitz |
| 5,040,700 A * | 8/1991 | Compton .................... 222/146.5 |
| 5,287,994 A | 2/1994 | Dempsey |
| 5,312,046 A | 5/1994 | Knoch et al. |
| D347,788 S | 6/1994 | Steijns et al. |
| 5,346,716 A | 9/1994 | Bakal et al. |
| 5,358,182 A | 10/1994 | Cappeau et al. |
| 5,381,930 A | 1/1995 | Kalabakas |
| 5,441,392 A | 8/1995 | Lundback |
| D365,980 S | 1/1996 | Matara et al. |
| 5,636,922 A * | 6/1997 | Clark ............................. 366/145 |
| 5,700,991 A * | 12/1997 | Osbern ......................... 219/430 |
| 5,738,705 A | 4/1998 | Anderson et al. |
| 5,785,208 A * | 7/1998 | Dobbs et al. ................... 222/148 |
| 5,786,573 A * | 7/1998 | Fabrikant et al. ............. 219/535 |
| 5,794,820 A | 8/1998 | Shabbits et al. |
| 5,811,766 A * | 9/1998 | Fabrikant et al. ............. 219/521 |
| 5,858,089 A | 1/1999 | Martinovic |
| 5,906,856 A | 5/1999 | Roden et al. |
| 5,931,387 A | 8/1999 | Hurley et al. |
| 5,990,456 A * | 11/1999 | Kilbride ........................ 219/432 |
| 6,042,358 A | 3/2000 | Komdeur et al. |
| 6,053,431 A | 4/2000 | Hurley et al. |
| 6,070,573 A | 6/2000 | Howe et al. |
| 6,082,247 A | 7/2000 | Beaulicu |
| 6,089,406 A * | 7/2000 | Feldner ......................... 222/103 |
| 6,216,911 B1 * | 4/2001 | Kreitemier et al. ................ 222/1 |
| 6,237,589 B1 | 5/2001 | Denyer et al. |
| 6,290,412 B1 | 9/2001 | Birmingham |
| 6,341,718 B1 | 1/2002 | Schilthuizen et al. |
| 6,352,013 B1 | 3/2002 | Schlattl et al. |
| 6,375,089 B1 | 4/2002 | Taylor et al. |
| 6,450,419 B1 | 9/2002 | Martens, III et al. |
| 6,460,736 B1 | 10/2002 | D'Agostino |
| 6,513,727 B1 | 2/2003 | Jaser et al. |
| 6,632,336 B2 | 10/2003 | Kasuya |
| 6,637,673 B1 | 10/2003 | Zur et al. |
| 7,326,884 B1 * | 2/2008 | Anderson et al. ............. 219/433 |
| 2003/0089743 A1 | 5/2003 | Py et al. |
| 2003/0201284 A1 | 10/2003 | Martin et al. |

* cited by examiner

METERED VOLUME LIQUID DISPENSING DEVICE

This application claims the benefit of U.S. Provisional Application No. 60/583,224, filed Jun. 24, 2004.

BACKGROUND OF THE INVENTION

The present invention relates to liquid dispensing devices, such as a liquid dispensing device that dispenses a predetermined and adjustable metered volume of liquid.

For many people, keeping track of their food intake is important, whether for health purposes, tracking calories, or other reasons. Many food product dispensers provide no way for the user to easily control, or even know, how much of the food product is being dispensed, whether from the standpoint of volume, calorie value, and/or weight. Instead, if the user wishes to keep track of these features, the user may need to use a measuring spoon or cup, scale or other instrument.

SUMMARY OF INVENTION

In one aspect of the invention, a hand-operated device for dispensing a metered volume of a liquid food product includes a reservoir constructed and arranged to contain a quantity of liquid food product and an opening from which to dispense liquid food product. A liquid metering device may control a volume of liquid food product dispensed at the opening, and an actuator may cause a predetermined volume of liquid food product to be dispensed under the control of the liquid metering device. In one embodiment, the device may be adapted to controllably dispense two or more selectable volumes of the food product, e.g., so as to allow a user to select and dispense a desired volume. In another embodiment, a heating element may be used to heat at least a portion of the liquid food product. For example, the device may be used to heat, liquefy and dispense one or more predetermined volumes of butter or other food product.

In one embodiment, a hand held dispenser may include the reservoir, opening, liquid metering device and actuator, e.g., so that a user may hold and operate the device to dispense food product in one or more desired locations. The device may include a base that removably supports the dispenser, e.g., acts as a holder for the dispenser. In one arrangement, a heater may be provided in the base and arranged to heat the food product contained in the dispenser.

In one aspect of the invention, a method of dispensing a metered volume of liquid food product from a hand-operated dispensing device includes inserting a quantity of food product into a hand held dispensing device, heating the food product while in the hand held dispensing device, and dispensing a predetermined volume of liquid food product from the hand held dispensing device. The method may include a step of selecting one of a plurality of predetermined volumes of liquid food product that may be dispensed.

In one embodiment, a hand-operated device for dispensing a predetermined metered volume of liquid food product (LFP) may have a reservoir constructed and arranged to contain a quantity of food product and an opening from which to dispense the LFP. The device may also include a liquid metering device that meters a predetermined volume of LFP. The liquid metering device may include a volume adjuster to allow a user to selectively adjust the volume of LFP dispensed from within a range of predetermined metered volumes. An actuator may receive an input signal and subsequently cause the delivery of the predetermined metered volume of LFP to the opening for dispensing. The device may also include a heating element that heats at least a portion of the device and, consequently, also heats the LFP contained within the device.

These and other aspects of the invention will be apparent from the following description and claims.

BRIEF DESCRIPTION OF DRAWINGS

The foregoing and other aspects of the invention will be appreciated more fully from the following drawings and related description in which.

DETAILED DESCRIPTION

Figure 1:
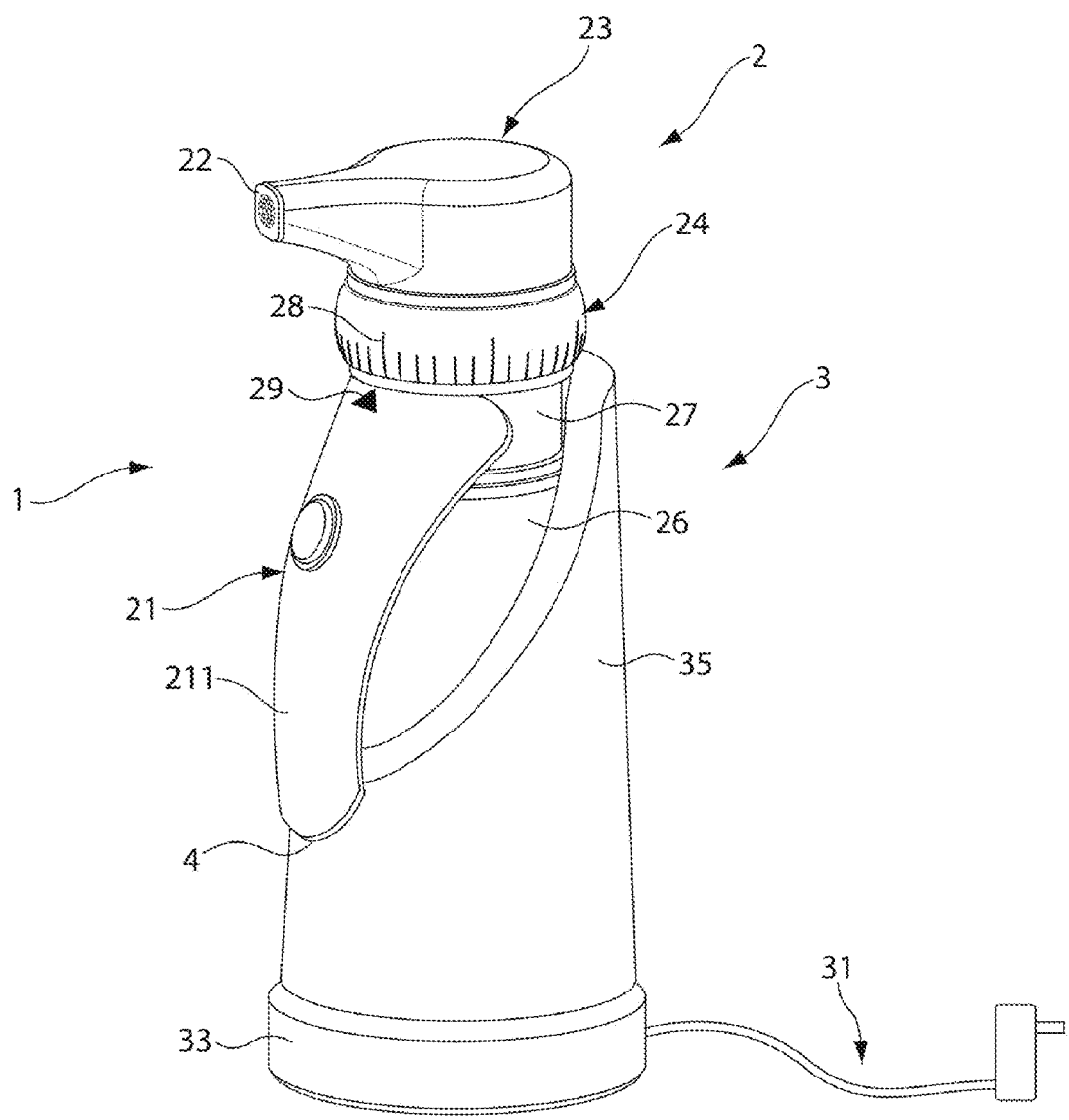
FIG. 1 is a perspective view of a metered volume liquid dispensing device.

In the description that follows, the word "liquid" is meant to include matter characterized by a readiness to flow and relatively high incompressibility. Thus, in the discussion herein, the word liquid includes liquids of both homogeneous (e.g., cooking oil) and heterogeneous (e.g., liquefied butter) composition. Furthermore, the word liquid is used herein to include a liquid medium including solid particles (e.g., colloids and slurries), and mixtures of liquids (e.g., an emulsion). Finally, the word liquid, as used herein, encompasses food product that is liquefied by the device of the present invention as well as food product liquefied prior to introduction into the device of the present invention (whether heated before introduction into the device or that is in a liquid state at normal, ambient temperatures). Herein, "liquid food product" refers to food product in the liquid state as defined above. "Food product" used without the qualifying term "liquid" may include food product in either the solid or liquid state.

The present invention relates to a device and method for dispensing a metered volume of liquid from a dispenser. An exemplary application for this invention may be for use in dispensing a known (i.e., predetermined) quantity of liquid butter, in order for the user to know the specific amount of butter being used in food preparation and/or consumption. The quantity dispensed may be selected based on a volume, calorie and/or weight desired. However, the present invention is not limited to use with butter. The invention may also be suitable for dispensing metered volumes of other substances in liquid form, such as cooking oil, vegetable shortening, chocolate syrup and maple syrup, as well as other consumable substances that may require or otherwise benefit from heating or melting to liquefy or partially liquefy the substance before food preparation or consumption. It should be understood that although portions of the description of the invention herein may refer to butter as the substance which is melted and dispensed from the device of the present invention, the invention is not limited to use with butter, and may be used with any of the previously described substances or other substances known to those of ordinary skill in the art.

In one illustrative embodiment, a hand-operated dispensing device includes a reservoir, a heater, an opening, a liquid metering device, and an actuator. The reservoir contains a quantity of food product that may be in either solid or liquid form. If the food product in the reservoir is in solid form, heat from the heater may act to liquefy the solid food product.

Alternatively, if the food product in the reservoir is in liquid form, heat from the heater may act to heat the LFP at any point within the device. The reservoir is in fluid communication with the opening of the device, and the liquid metering device may control the flow of LFP between the reservoir and the opening such that actuation of the device results in delivery of a predetermined volume of LFP through the opening.

In another illustrative embodiment, a hand-operated dispensing device includes a reservoir, an opening, a liquid metering device, a volume adjuster, and an actuator. The reservoir may contain a quantity of liquid food product and be in fluid communication with the opening of the device. The liquid metering device may control the flow of LFP between the reservoir and the opening such that actuation of the device results in delivery of a predetermined volume of LFP through the opening of the device. In this embodiment, the volume adjuster may be adjustable by a user and operably coupled to the liquid metering device so that a user may vary the predetermined volume of LFP provided by the device.

In another illustrative embodiment, a method of dispensing a predetermined metered volume of LFP from a hand-operated dispensing device may include inserting a quantity of solid or liquid food product into a reservoir of a dispensing device. The food product may be heated, e.g., using a heating element. An actuator may be activated to dispense a predetermined volume of heated LFP from the opening of the device.

In yet another illustrative embodiment, a method of dispensing a predetermined metered volume of LFP from a hand-operated dispensing device may include inserting a quantity of LFP into a reservoir of a dispensing device. A liquid metering device may be adjusted to provide one of a plurality of predetermined metered volumes of LFP from within a range of volumes. For example, the liquid metering device may have a volume adjuster with a metering range between one teaspoon and 4 tablespoons, and the user may select a desired volume that falls within that metering range, e.g., at teaspoon increments. With the desired predetermined metered volume of LFP selected, e.g., by use of a volume adjuster that is part of the liquid metering device, the actuator may be activated to dispense the predetermined metered volume of LFP from the device. Thus, in the example above, when the user selects a metered volume of two tablespoons, each activation of the actuator may result in the dispensing of two tablespoons of LFP. The volume adjuster may allow a user to select a predetermined volume of the liquid food product that corresponds to a desired calorie value and/or weight. Thus, for example, a user may select that 100 calories of the food product be dispensed, and upon actuation of the device, a volume of the food product corresponding to 100 calories may be dispensed.

It should be appreciated that various combinations of the above-described embodiments of the present invention can be employed together, but several aspects of the present invention are not limited in this respect. Therefore, although the specific embodiment disclosed in the figures and described in detail below employs particular combinations of the above-discussed features of the present invention, it should be appreciated that the present invention is not limited in this respect, as the various aspects of the present invention can be employed separately, or in different combinations. Thus, the particular embodiment described in detail below is provided for illustrative purposes only.

FIGS. 1-5 show an illustrative embodiment of a metered volume liquid dispensing device 1 in accordance with the present invention. This embodiment of the invention incorporates many of the inventive aspects discussed above.

FIG. 1 is a perspective view of a metered volume liquid dispensing device 1 that may include a dispenser 2 that sits within a base 3. As shown in FIG. 1, the base 3 may support the dispenser 2 when the dispenser 2 is not being used to dispense liquid. The dispenser 2 may be removed from the base and hand operated by operating an actuator 21, e.g., a pivoting trigger. Such actuation may cause a desired volume of LFP retained in a reservoir 26 to be dispensed from a dispensing head 23 via an exit nozzle 22 (e.g., an opening in the dispensing head 23 including one or more holes).

As shown in FIG. 1, the actuator 21 may include a trigger handle 211 that is pivotally connected to an actuator support 27. However, it should be understood that the invention is not limited in this respect, and that the actuator 21 may include a button, a switch, a lever, or any other actuator known in the art. For example, the reservoir 26 may be pressurized and actuation of the actuator 21 may open a valve that permits the LFP to be discharged under pressure from the exit nozzle 22. In one embodiment, the actuator 21 may be an electro-mechanical actuator that converts a mechanical input to an electrical output that is used to cause dispensing of the LFP, e.g., that actuates an electrically operated valve or pump to cause the LFP to be dispensed.

In one aspect of the invention, the device 1 may include a lock 4 that prevents undesired dispensing of the liquid food product. In this embodiment, a portion of the base 3 interposed between the actuator 21 and the reservoir 26 acts as a lock 4 to prevent movement of the actuator 21 when the dispenser 2 is held by the base 3. By preventing movement of the actuator 21, the lock 4 may prevent liquid from leaking or being accidentally discharged from the exit nozzle 22 while dispenser 2 is stored within base 3. The lock 4 may be provided in other ways, e.g., the base may be configured to include a cap that fits over the exit nozzle 22 while the dispenser 2 is stored in the base 3, the dispenser 2 itself may include a stop or other feature for limiting the motion of the actuator 21, the dispenser 2 may include a valve for blocking the flow of liquid from the exit nozzle 22, and so on.

In another aspect of the invention, the base 3 may be used to heat the dispenser 2. An upper portion 35 of the base may be heated and at least partially surround the dispenser 2 to facilitate heat transfer from the base 3 to the dispenser 2. It should be understood that heat transfer between the base 3 and the dispenser 2 may be achieved through thermal conduction, thermal convection, thermal radiation, and/or a combination thereof. In another embodiment, the base 3 may not include an upper portion 35 that surrounds any portion of the reservoir 26. In such an embodiment, the base 3 may only include a bottom portion 33 that holds the dispenser 2 and provides heat to the reservoir 26. Other arrangements will be appreciated by those of skill in the art. For example, the base 3 need not be heated (or provided at all) and a heating element may be incorporated into dispenser 2. In such a case, the dispenser 2 may receive electrical power from an internal source (e.g., a battery) or an external source (e.g., a power connection to the base that is engaged when the dispenser 2 rests on the base 3).

The device 1 may be powered as needed in any suitable way, such as by an internal source in the base 3 and/or dispenser 2, and/or by an external source. For example, in this embodiment, the device 1 includes an electrical cord 31 that connects to a power outlet (not shown) to provide an electrical current for the purpose of heating the base 3 and/or the dispenser 2. In another embodiment, electrical cord 31 may provide an electrical current for the purpose of mechanically agitating (e.g., stirring, mixing, or shaking) the LFP contained within the reservoir 26. The cord 31 may include a transformer (e.g., at the power outlet end) so that relatively low voltage/current is supplied to the base 3, e.g., to enhance the safety of the device.

The liquid volume that is delivered with each activation of the actuator 21 may be set using a volume adjuster 24. The volume adjuster 24 may include a rotatable dial that, when rotated, causes the volume dispensed to be changed. For example, the volume adjuster dial may be moved so that a marking 28 that represents a desired volume, calorie amount or weight is aligned with an indicator arrow 29. In one embodiment, liquid volumes that are commonly used in food preparation may be denoted by markings 28 located on the volume adjuster 24. For example, each activation of the actuator 21 may result in one tablespoon of liquid being delivered from the reservoir 26 and through the exit nozzle 22 when a marking 28 denoted "1 tbsp." is aligned with the indicator 29. It will be understood that the indicator arrow 29 may take any of several forms that provide the user with a visual indication of the volume adjuster setting. The volume adjuster 24 may allow for adjustment of two or more predetermined volumes to be dispensed within a range of volumes, e.g., 1 teaspoon to 4 tablespoons. Markings 28 may be provided at desired increments within the range, e.g., teaspoon increments.

In another embodiment, the volume adjuster 24 may include indications corresponding to a weight and/or calorie value of the volume dispensed. Such indications may need to be provided for a corresponding LFP, e.g., because a particular volume of one LFP, such as butter, may not have the same weight or calorie value as another LFP, such as chocolate syrup. Thus, different marking elements may be provided for use with different LFPs. For example, different ring members used with the volume adjuster 24 may be provided with the dispenser, with each ring member selectively mountable to the dispenser and having markings 28 that correspond to a particular LFP dispensed by the device, such as one ring for butter and another for chocolate. Alternately, the volume adjuster 24 may include markings that are adjustable on the adjuster ring so that markings for weight and/or calorie values can be properly corresponded with indicated volumes for different LFPs. For example, the adjuster dial in this embodiment may include two rings, one for calories and one for volume. A user may adjust the relative positions of the two rings, e.g., so that a calorie value marking lines up with a corresponding volume marking. Information regarding calorie and corresponding volume information may be provided separately, such as in a user's manual. Thereafter, the two rings may be rotated together, indicating both the calorie value and the volume to be dispensed.

It should be understood that a volume adjuster 24 may include any suitable arrangement to allow adjustment of a volume of LFP to be dispensed. For example, the volume adjuster 24 may include a slide member, e.g., mounted on a side of the reservoir 26, that can be moved linearly to adjust a volume dispensed. In another embodiment, the volume adjuster 24 may include an electronic display that indicates the selected volume, calorie and/or weight of LFP to be dispensed as well as a user input (such as one or more push buttons) to allow adjustment of the volume.

Figure 2:
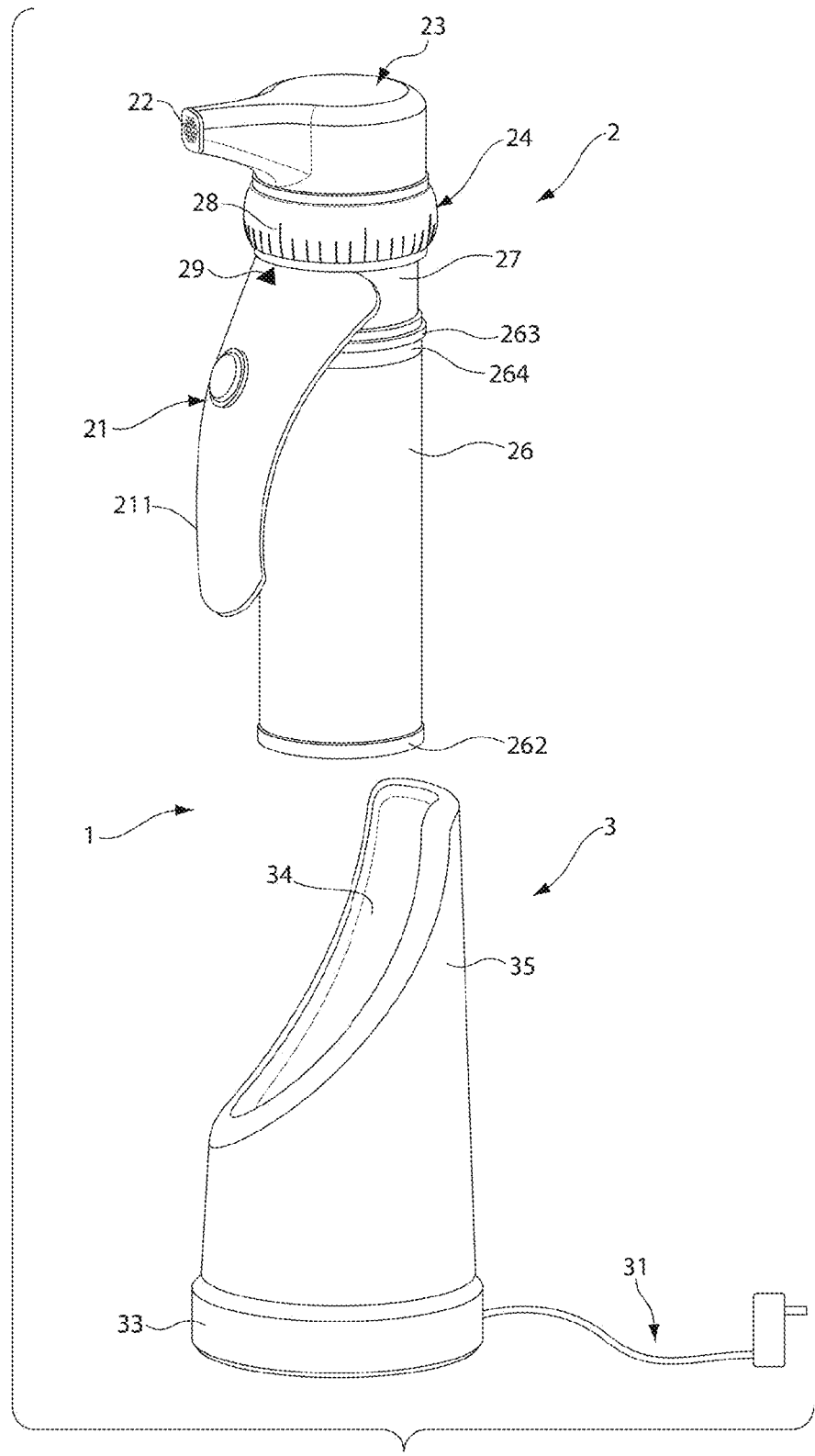
FIG. 2 is an exploded perspective view of the dispenser and base of FIG. 1.

FIG. 2 is a perspective view of the dispenser 2 separated from the base 3. As shown, the dispenser 2 may be completely separable from base 3, thereby facilitating portability of the dispenser 2. In another embodiment, reservoir 26 may be fixed to the base 3 and the dispenser 2 may include a flexible hose or tube that interconnects the reservoir 26 and the dispensing head 23 and allows a user to dispense LFP remote from the base. Although the portability of the device 1 may be limited in such an embodiment, it has the potential advantage of allowing a large volume of LFP to be stored within the reservoir 26 and may be useful in applications related to commercial and/or large-volume food preparation.

Figure 3:
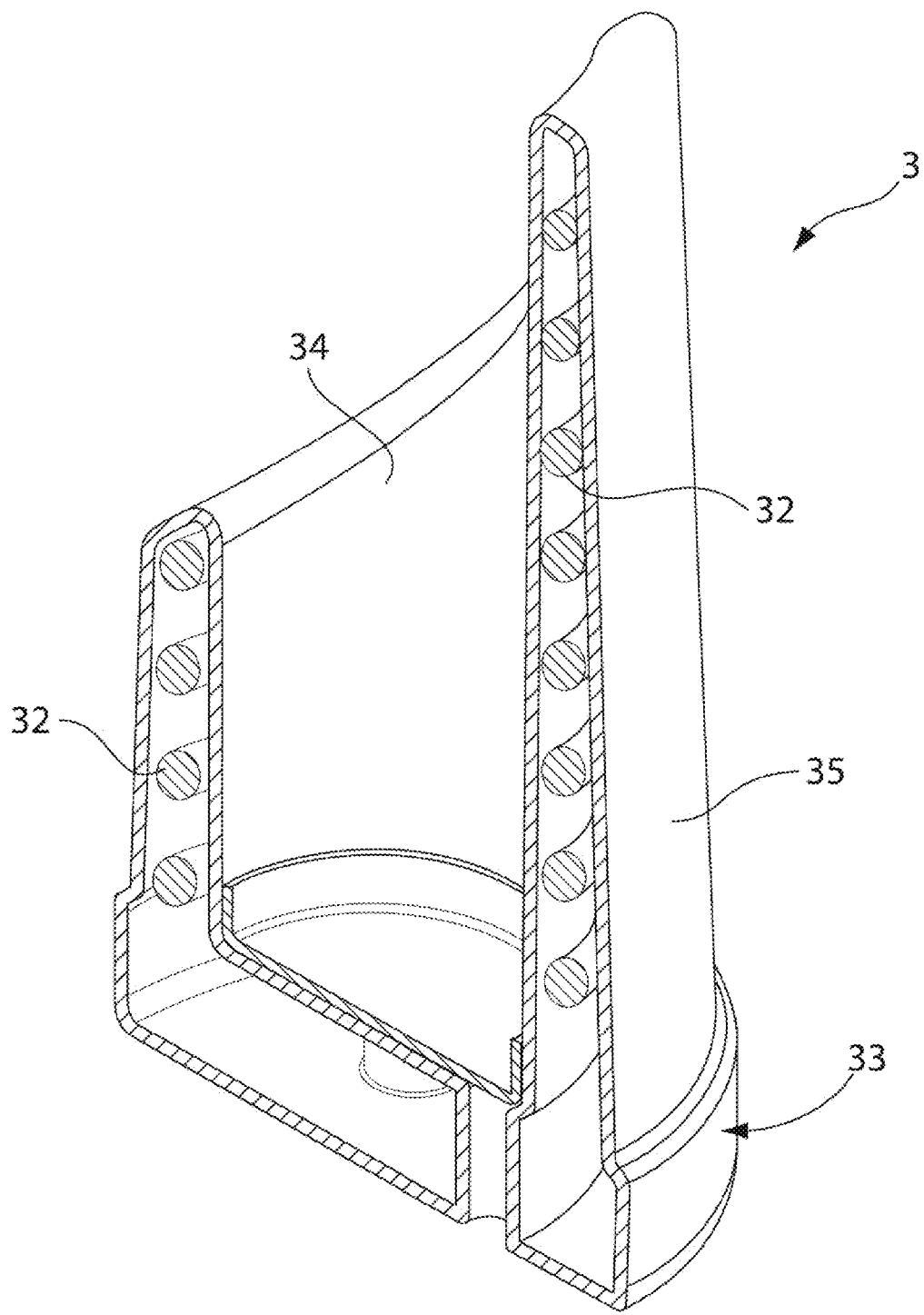
FIG. 3 is a cross-sectional perspective view of the base of FIG. 1.

FIG. 3 is a cross-sectional perspective view of the base 3. As shown in FIG. 3, a heating element 32 may be contained within the base 3, e.g., as a flexible sheet heating element that is wrapped around a portion of the interior of the base 3. In another embodiment, the heating element may be positioned in the lower portion 33 of the base 3 or on the inner surface 34 of the base 3. As discussed above, the base 3 may include an electrical cord 31 to provide an electrical current to the heating element 32. In another embodiment, the heating element 32 in the base 3 (or dispenser 2) may be battery operated to provide a cordless liquid dispensing device.

In one embodiment, the heating element 32 may be a resistance heating element, and the temperature of the resistance heating element 32 may be controlled through the use of a thermally sensitive resistor (thermistor) or other controller (not shown) of the type that is well known to those of skill in the art. In one embodiment, the base may be heated to a predetermined temperature after power is supplied to the base 3. For example, the heating element 32 may be designed to heat to a temperature that is high enough to achieve suitably low viscosity of butter in the reservoir 26, but prevents separation of the butter. In another embodiment, the heating element is automatically heated to a temperature of between 100 and 120 degrees Fahrenheit, and more preferably, about 105 degrees Fahrenheit. In another embodiment, the base 3 includes a temperature gauge operably coupled to the heating element that is adjustable to select a desired temperature to which to heat the base 3. In another embodiment, the base 3 includes a timer that activates the heating element 32 at some fixed time of the day and subsequently deactivates the heating element 32 at some fixed time later in the day. In another embodiment, the base 3 includes a timer operably coupled to the heating element that is adjustable to select a desired period of activation for the heating element 32. In still another embodiment, the base 3 includes a switch operably coupled to the heating element that allows the user to activate the heating element 32 as desired.

The base 3 may be constructed of a combination of materials that will facilitate heat transfer from the heating element 32 to the inner surface 34 and also minimize heat transfer from the heating element 32 to the outer surface 35. In particular, the inner surface 34 may be constructed of a material that has higher thermal conductivity than the material that is used to construct the outer surface 35. For example, the inner surface 34 may be constructed of stainless steel, and the outer surface 35 may be constructed of plastic. Of course, in other embodiments, the inner and outer surfaces 34 and 35 may be made of the same material, e.g., molded of plastic as a unitary part.

Figure 4:
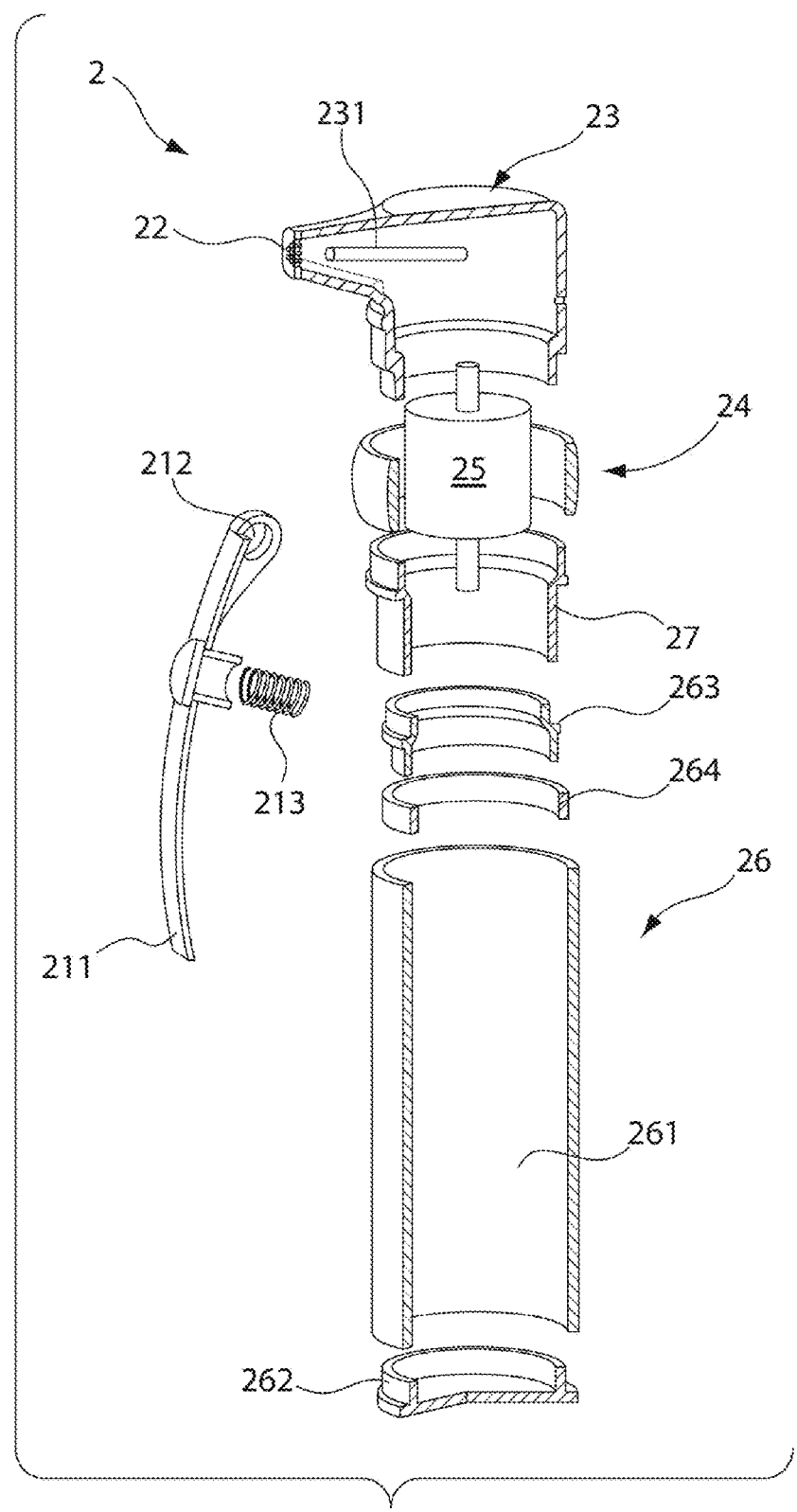
FIG. 4 is an exploded cross-sectional perspective view of the dispenser of FIG. 1.

FIG. 4 is an exploded cross-sectional perspective view of the dispenser 2. The reservoir 26 may include a side wall 261 and a bottom wall 262 at the base of the side wall 261. In one embodiment, the side wall 261 and the bottom wall 262 may be two separate pieces that are permanently attached through any of numerous processes such as welding, press fitting, or adhesion. In another embodiment, the side wall 261 and bottom wall 262 are a single piece that form a volume for inserting food product. However, it should be appreciated that reservoir 26 may be formed in any suitable way, with any number or type of different walls or other parts having any suitable shapes.

The side wall 261 and bottom wall 262 may be constructed of any of numerous materials, such as glass, plastic, ceramic, porcelain, or stainless steel, and may have any suitable size depending upon the desired volume of butter or other substance to be dispensed. The side wall 261 and the bottom wall 262 may be constructed of different materials. In one embodiment, side wall 261 is constructed of plastic and the bottom wall 262 is constructed of stainless steel such that most of the heat transfer to the dispenser 2 occurs through the bottom wall 262 and the side wall 261 remains cool enough to allow the user to handle the dispenser 2. In another embodiment, insulating material is placed over all or a portion of the reservoir 26 to permit a user to handle the dispenser 2 containing heated LFP.

In one embodiment, a quantity of food product may be introduced into the reservoir 26 by removing the bottom wall 262 or by accessing the reservoir 26 at a top opening (e.g., by removing the dispensing head 23 from the reservoir 26). In one embodiment, the reservoir 26 may be shaped and sized to receive a portion of food product in solid form. For example, one or more sticks of butter or portions thereof, or butter tabs, may be inserted into the reservoir to be melted and dispensed from the dispenser 2. In another embodiment, a butter cartridge, sized to contain a specific amount of butter, may be inserted into the reservoir 26 prior to melting.

As shown in FIG. 4, a flange 263 may be used to mechanically connect the reservoir 26 to an actuator support 27. A spacer ring 264 may be inserted between the reservoir 26 and the actuator support 27 to act as a washer and to help ensure a leak-proof seal between the reservoir 26 and the actuator support 27. In one embodiment, the top portion of the reservoir 26 is threadedly engaged with the bottom portion of the flange 263 such that the reservoir 26 may be easily removed for cleaning or replacement purposes. In another embodiment, the flange 263 may be permanently attached to the top portion of the container 261 through any of numerous processes such as welding, press fitting, or adhesion. The flange 263 may also be mechanically connected to the actuator support 27 through any of numerous processes such as welding, press fitting, or adhesion.

As shown in FIG. 4, the actuator handle 211 may have mounting holes 212 that engage with a respective mounting pin (not shown) on the actuator support 27 and allow the actuator handle 211 to pivot about the mounting pins. Pressure applied at or near the free end of the handle 211 may actuate a liquid metering device 25 to control the volume of liquid dispensed from the exit nozzle 22. After the actuator 21 has been depressed, a spring 213 may return the handle 211 to a ready position for subsequent actuation.

Figure 5:
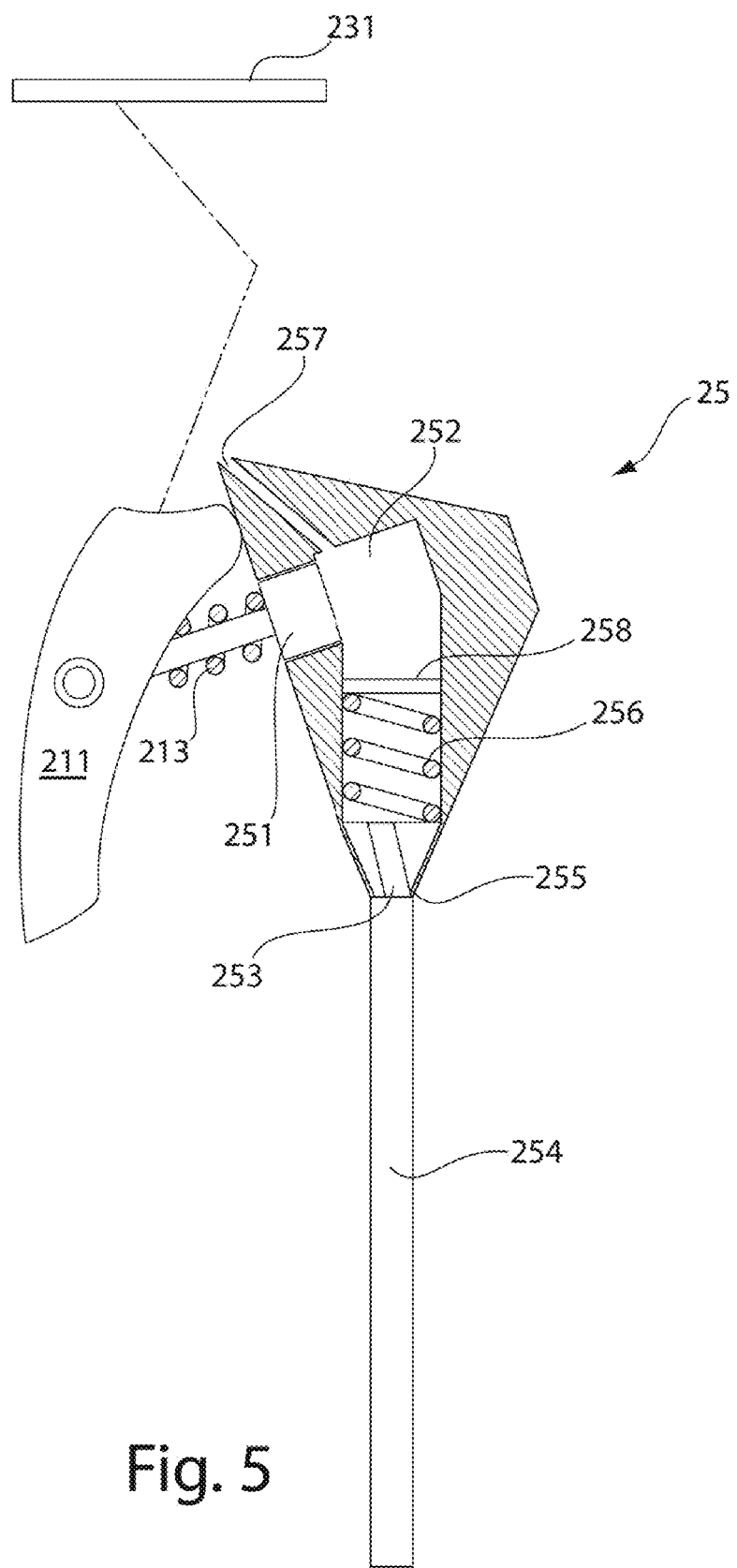
FIG. 5 is a cross-sectional view of the liquid metering device of FIG. 4.

As discussed above, the liquid metering device 25 may include the volume adjuster 24 to control the volume setting of the liquid metering device 25. The liquid metering device 25 may include any suitable arrangement to control the volume of liquid dispensed, and as shown in FIG. 5, in this illustrative embodiment includes a piston pump of the type commonly used in household spray bottles. Of course, it will be understood that the liquid metering device 25 may have any suitable arrangement, such as a flowmeter and valve arrangement that operates to detect flow exiting the dispenser and closes the valve when a predetermined volume has been dispensed. Alternately, the liquid metering device 25 may include a pump that may be controllably operated, e.g., based on a pump run time, to dispense a metered volume of LFP.

In this illustrative embodiment, activation of the actuator 21 may move a piston 251 into a chamber 252 and displace liquid in the chamber 252. The liquid metering device 25 may further include a one-way valve 253 that prevents the liquid displaced in the chamber 252 from traveling down an intake channel 254 and returning to the reservoir 26. Instead, liquid displaced from the chamber 252 may flow out of an exit channel 257, ultimately exiting the dispenser 2 through the exit nozzle 22. After activation of the actuator 21 is completed, a spring 213 may return the handle 211 to the ready position. The return of the handle 211 to the ready position may act to withdraw the piston 251 from the chamber 252. When the piston 251 is withdrawn from the chamber 252, the pressure in the chamber 252 may become less than the pressure in the intake channel 254, causing the one-way valve 253 to lift off of the valve seat 25 and allow flow of liquid from the intake channel 254 into the chamber 252. The flow of liquid from the intake channel 254 into the chamber 252 stops when the valve spring 256 returns the one-way valve 253 to the valve seat 255. The position of spring 256 may be fixed by spring bracket 258.

The intake channel 254 and exit channel 257 may be channels of any length and any cross-sectional open area. The cross-sectional open area of the intake and exit channels 254 and 257 may be variable along the length of the channel. The intake and exit channels 254 and 257 may be constructed of any of numerous materials such as plastic, nylon, stainless steel, or rubber. The intake and exit channels 254 and 257 may be further constructed of flexible materials. Finally, it will be understood that the intake and exit channels 254 and 257 need not share any dimensional or physical characteristics.

The volume adjuster 24 may be connected to the flow metering device 25 such that movement of the volume adjuster 24 controls one or more features of the liquid metering device 25, thereby varying the liquid volume dispensed with each activation of the trigger 211. In one embodiment, movement of the volume adjuster 24 may change the size of the chamber 252. In another embodiment, movement of the volume adjuster 24 may change the length of travel of the piston 251 into the chamber 252. For example, movement of the volume adjuster 24 may control the position of a mechanical stop that blocks further motion of the piston 251 into the chamber 252. In another embodiment, movement of the volume adjuster 24 may change the lift height of the one-way valve 253 off of the valve seat 255. For example, movement of the volume adjuster 24 may control the position of a mechanical stop that limits the lift height of the one-way valve 253 off of the valve seat 255. As another example, movement of the volume adjuster 24 may control the tension of the valve spring 256, whereby a higher spring tension shortens the time available for liquid to travel from the intake channel 254 into the chamber 252. By calibrating the volume adjuster 24 with a change in a feature of the flow metering device 25, a metered volume of liquid may be dispensed from the dispenser 2.

The exit nozzle 22 may include either a single orifice or a plurality of orifices. In one embodiment, the spray pattern of the liquid emitted from the exit nozzle may be varied by a rotatable dial, a movable slide or other element that changes the open area and/or shape of the exit nozzle. As shown in FIGS. 4 and 5, the actuator 21 may be mechanically coupled to a cleaning member 231 that is axially aligned with the liquid flow and sits between the exit channel 257 and the exit nozzle 22. In this embodiment, activation of the actuator 21 moves the cleaning member 231 as well as moves the piston 251 into the chamber 252. Motion of the cleaning member 231 may clear deposits that may have formed in the dispensing head 23 and exit nozzle 22 in the interval between consecutive uses of the dispenser 2. In this embodiment, the actuator 21 may be coupled to the cleaning member 231 such that the first part of the travel of the actuator 21 may act to move the cleaning member 231 back and forth along the axis of liquid flow, and the subsequent second part of travel of the actuator 21 may act upon the liquid dispensing device 25.

It should be understood that the dispenser arrangement of FIGS. 1-5 is but one illustrative embodiment for dispensing a metered volume of butter or other substance. For example, the dispenser 2 may include a spray pump dispenser that may be actuated similar to an aerosol spray can such that depression of a nozzle may dispense a predetermined volume of butter or other liquid. In another embodiment, the dispensing head may be a cap-like device with a nozzle that is calibrated to dispense a metered volume of liquid based on the rotation of the cap around the container to predetermined positions (e.g., rotation of the dispensing head 23 may cause rotation of the volume adjuster 24). In this embodiment, the reservoir 26 may be deformable like a squeeze bottle to create the force on the liquid towards the dispensing head and out of the exit nozzle. It should be understood that the liquid volume adjuster can take any of numerous forms as known by those of skill in the art.

The metered volume liquid dispensing device 1 may include a liquid level sensor for determining the level of LFP contained in the reservoir 26. In one embodiment, the sensor may include a clear window embedded in the reservoir 26 such that the user may visually observe the level of LFP contained in the reservoir. In another embodiment, the sensor may include a dipstick that the user may immerse in the reservoir to determine the level of LFP contained in the reservoir 26.

The metered volume liquid dispensing device 1 may further include a temperature sensor for determining the temperature of the LFP contained in the reservoir 26. In one embodiment, the temperature sensor may be a thermocouple of the kind that is well known to those of skill in the art. The output of the temperature sensor may be used to provide the user with a signal of the temperature of the LFP contained in the reservoir. In one embodiment, the signal may be a visual display of the temperature. In another embodiment, the signal may be an audible indicator (e.g., a bell). The signal may serve as a signal to the user that the temperature of the LFP in the reservoir has fallen below a threshold and should be returned to proximity with the activated heating element 32. Conversely, the signal may indicate that the temperature of the LFP has reached the desired threshold and the device is ready for use.

In one embodiment, the metered volume dispensing device 1 may be operated as follows. A quantity of butter may be inserted into the reservoir 26 by way of a removable compartment near the base of the reservoir 26. Alternatively, the butter may be inserted into the reservoir 26 through a top opening of the reservoir 26 after removing the dispensing head 23 from the dispenser 2. The dispenser 2 may then be placed onto the base 3 so that the dispenser 2 and the butter therein may be heated by the base 3. By plugging in the electrical cord 31 to an electrical outlet, the heating element within the base 3 may heat the dispenser 2 and the butter. When the butter is ready for dispensing, the dispenser 2 can be removed from the base 3 to dispense the butter. By rotating the liquid volume adjuster 24 to a specific predetermined volume setting, a metered volume of butter can be predetermined for dispensing. By activating the actuator 21, the volume of liquid predetermined by the position of the adjuster 24 will be dispensed from the exit nozzle 22 of the dispensing head 23.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A hand-operated device for dispensing a metered volume of a liquid butter, comprising:
   a reservoir constructed and arranged to contain a quantity of liquid butter;
   an opening from which to dispense liquid butter;
   a liquid metering device to control a volume of liquid butter dispensed at the opening, the liquid metering device including a piston pump that moves liquid butter from the reservoir through the opening;
   an actuator including a trigger handle pivotally mounted relative to the reservoir and that operates the piston pump and causes a predetermined volume of liquid butter to be dispensed by the liquid metering device when the trigger handle is moved toward the reservoir; and
   a base having an opening that receives at least a portion of the reservoir and at least partially surrounds the reservoir, the base having an electric heating element to heat at least a portion of the reservoir and the liquid butter by thermal conduction and/or convection, the base having a portion that is interposed between the trigger handle and the reservoir to inhibit movement of the trigger handle relative to the base when the reservoir is received by the base;
   wherein the reservoir, opening, liquid metering device, and actuator are attached together in a single hand-held dispenser unit that is independent of, and separable from, the base.

2. The device of claim 1, further comprising:
   a volume adjuster that is movable by a user to control a volume of liquid butter dispensed at the opening by the liquid metering device, the volume adjuster being movable relative to the reservoir between at least two positions that correspond to different volumes of liquid butter dispensed, the volume adjuster controlling movement of the piston pump to cause the piston pump to move a corresponding amount of liquid butter through the opening.

3. The device of claim 2, wherein the volume adjuster includes two or more markings that each correspond to a respective position of the volume adjuster and indicate a corresponding calorie value of liquid butter dispensed for the corresponding volume adjuster position.

4. The device of claim 1, wherein the electric heating element is battery powered.

5. The device of claim 1, wherein the reservoir includes an insulating material positioned over a portion of a sidewall of the reservoir.

6. A hand-operated device for dispensing a metered volume of a liquid butter, comprising:
   a reservoir constructed and arranged to contain a quantity of liquid butter;
   an opening from which to dispense liquid butter;
   a liquid metering device to control a volume of liquid butter dispensed at the opening, the liquid metering device including a piston pump that moves liquid butter from the reservoir through the opening;
   an actuator including a trigger handle pivotally mounted relative to the reservoir and that operates the piston pump and causes a predetermined volume of liquid butter to be dispensed by the liquid metering device when the trigger handle is moved toward the reservoir;
   a volume adjuster that is movable by a user to control a volume of liquid butter dispensed at the opening by the liquid metering device, the volume adjuster being movable relative to the reservoir between at least two positions that correspond to different volumes of liquid butter dispensed, the volume adjuster controlling movement of the piston pump to cause the piston pump to move a corresponding amount of liquid butter through the opening; and a base having an opening that receives at least a portion of the reservoir and at least partially surrounds the reservoir, the base having an electric heating element to heat at least a portion of the reservoir and the liquid butter by thermal conduction and/or convection, the base having a portion that is interposed between the trigger handle and the reservoir to inhibit movement of the trigger handle relative to the base when the reservoir is received by the base;

wherein the reservoir, opening, liquid metering device, volume adjuster and actuator are attached together in a single hand-held dispenser unit that is independent of, and separable from, the base.

7. The device of claim 6, wherein the reservoir has a volume to contain multiple predetermined volumes of liquid butter.

8. The device of claim 6, wherein the device is constructed and arranged to suitably heat, liquefy and dispense controlled volumes of butter.

9. The device of claim 6, wherein the volume adjuster includes two or more markings that each correspond to a respective position of the volume adjuster and indicate a corresponding calorie value of liquid butter dispensed for the corresponding volume adjuster position.

10. The device of claim 6, wherein the electric heating element is battery powered.

11. The device of claim 6, wherein the reservoir includes an insulating material positioned over a portion of a sidewall of the reservoir.

* * * * *